United States Patent
Huang

(10) Patent No.: US 6,634,291 B2
(45) Date of Patent: Oct. 21, 2003

(54) COMBINATION PRINTING METHOD FOR IMD HOT PRESS AND INJECTION MOLDING APPLICATION

(75) Inventor: Jui Peng Huang, Taipei (TW)

(73) Assignee: Taiyi Precision Tech Corp., Taipei Hsien (TW)

( * ) Notice: Subject to any disclaimer, the term of this patent is extended or adjusted under 35 U.S.C. 154(b) by 58 days.

(21) Appl. No.: 09/944,942

(22) Filed: Sep. 1, 2001

(65) Prior Publication Data

US 2003/0041754 A1 Mar. 6, 2003

(51) Int. Cl.[7] ................................................ B41M 1/12
(52) U.S. Cl. ...................... 101/129; 101/211; 101/483; 101/488
(58) Field of Search ........................... 101/129, 211, 101/483, 35, 488

(56) References Cited

U.S. PATENT DOCUMENTS

| 3,917,768 A | * | 11/1975 | Abate-Daga et al. | ........... 264/5 |
| 5,343,802 A | * | 9/1994 | Shimada | ....................... 101/35 |
| 6,001,292 A | * | 12/1999 | Atake | .......................... 264/135 |
| 6,170,881 B1 | * | 1/2001 | Salmon et al. | ................. 283/91 |
| 6,244,183 B1 | * | 6/2001 | Haney et al. | ................. 101/490 |

* cited by examiner

Primary Examiner—Ren Yan
(74) Attorney, Agent, or Firm—Pro-Techtor International Services

(57) ABSTRACT

A combination printing method for IMD (In-Mold Decoration) hot press and injection molding application includes the steps of (1) offset printing; (2) color pattern offset printing; (3) primary screen printing; (4) primary baking; (5) secondary screen printing; (6) secondary baking; (7) hot pressing; (8) shape rolling; and (9) injection-molding.

12 Claims, 2 Drawing Sheets

COMBINATION PRINTING METHOD FOR IMD HOT PRESS AND INJECTION MOLDING APPLICATION

BACKGROUND OF THE INVENTION

The present invention relates to a printing technology and, more particularly, to a combination printing method for IMD (In-Mold Decoration) hot press and injection molding application.

Conventional IMD (In-Mold Decoration) printing methods include screen-printing, spray-painting, and direct injection-molding. Few IMD printing providers accept the method of screen-printing because the printing speed of the method of screen-printing is slow (about 2000 runs per hour), and not suitable for rapid output. The method of spray-printing is complicated. After the application of each color of paint and before the application of a nest color of paint, the workpiece must be dried by baking or with the radiation of a UV lamp. The method of direct injection-molding is the most popularly accepted printing method. According to this direct injection-molding printing method, the desired color pigment is added to the material before IMD hot pressing and injection molding. However, because only one single color is provided each time, this method cannot produce a versatile color pattern.

SUMMARY OF THE INVENTION

The present invention has been accomplished to provide a combination printing for IMD (In-Mold Decoration) hot press and injection molding application, which eliminates the drawbacks of the prior art printing methods. According to the present invention, the combination printing method comprises the steps of (1) offset printing; (2) color pattern offset printing; (3) primary screen printing; (4) primary baking; (5) secondary screen printing; (6) secondary baking; (7) hot pressing; (8) shape rolling; and (9) injection-molding. By means of the performance of the aforesaid steps and the application of specially prepared compound ink, rapid printing output with versatile printing pattern is achieved.

DETAILED DESCRIPTION OF THE PREFERRED EMBODIMENT

Figure 1:
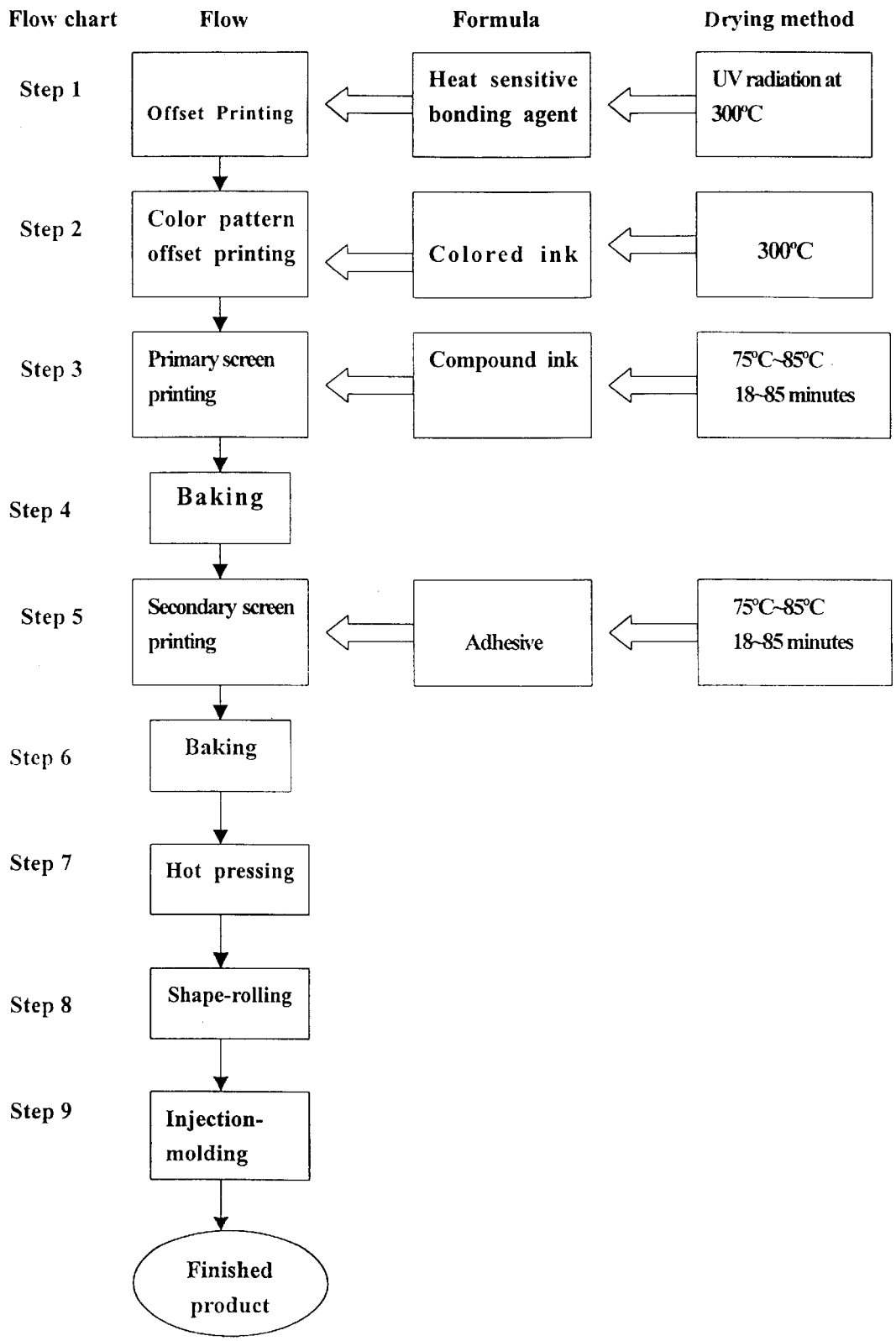
FIG. 1 is a block diagram explaining the procedures of a combination printing method according to the present invention.

Referring to FIG. 1, the invention comprises the steps of (1) offset printing; (2) color pattern offset printing; (3) primary screen printing; (4) primary baking; (5) secondary screen printing; (6) secondary baking; (7) hot pressing; (8) shape rolling; and (9) injection-molding.

At first, use an offset printer to print a transparent heat sensitive bonding agent on a single piece of film material. The transparent heat sensitive bonding agent is for enabling the printing ink to be used in a further printing procedure to become compatible to the film material. During the offset printing procedure, the heat sensitive bonding agent is dried by the radiation of UV of the offset printer at 300° C.

After the first procedure of offset printing, the offset printer is operated again to print a color printing on the layer of bonding agent at the single piece of film material subject to a predetermined color pattern, and to apply a UV radiation at 300° C. to the color printing.

After the second procedure of color-pattern offset printing, use a screen printing machine to print a compound ink obtained from the mixture of printing ink and heat sensitive bonding agent on the color printing of the single piece of film material thus obtained from the aforesaid second procedure of color-pattern offset printing. After the third procedure of primary screen printing, the printed single piece of film material is baked to a dry status at about 75°~85° for about 18~25 minutes. The drying temperature and time are determined subject to the material and thickness of the single piece of film material and the nature of the compound ink.

After the fourth procedure of primary baking, use the screen printing machine to print a layer of adhesive on the layer of compound ink of the single piece of film material for enabling the single piece of film material to be adhered to the workpiece during the further injection-molding procedure.

After the fifth procedure of secondary screen printing, the printed single piece of film material is baked to a dry status at about 75°~85° for about 18~25 minutes. The drying temperature and time are determined subject to the material and thickness of the single piece of film material and the nature of the compound ink.

After the sixth procedure of secondary baking, the well-dried single piece of film material thus obtained is put in the steel die of a hot press and shape-formed. After cooling of the steel die, a semi-finished product is obtained.

After the seventh procedure of hot pressing, the semi-finished product is put in an injection molding machine and injection-molded with plastics to form the desired finished product.

Figure 2:
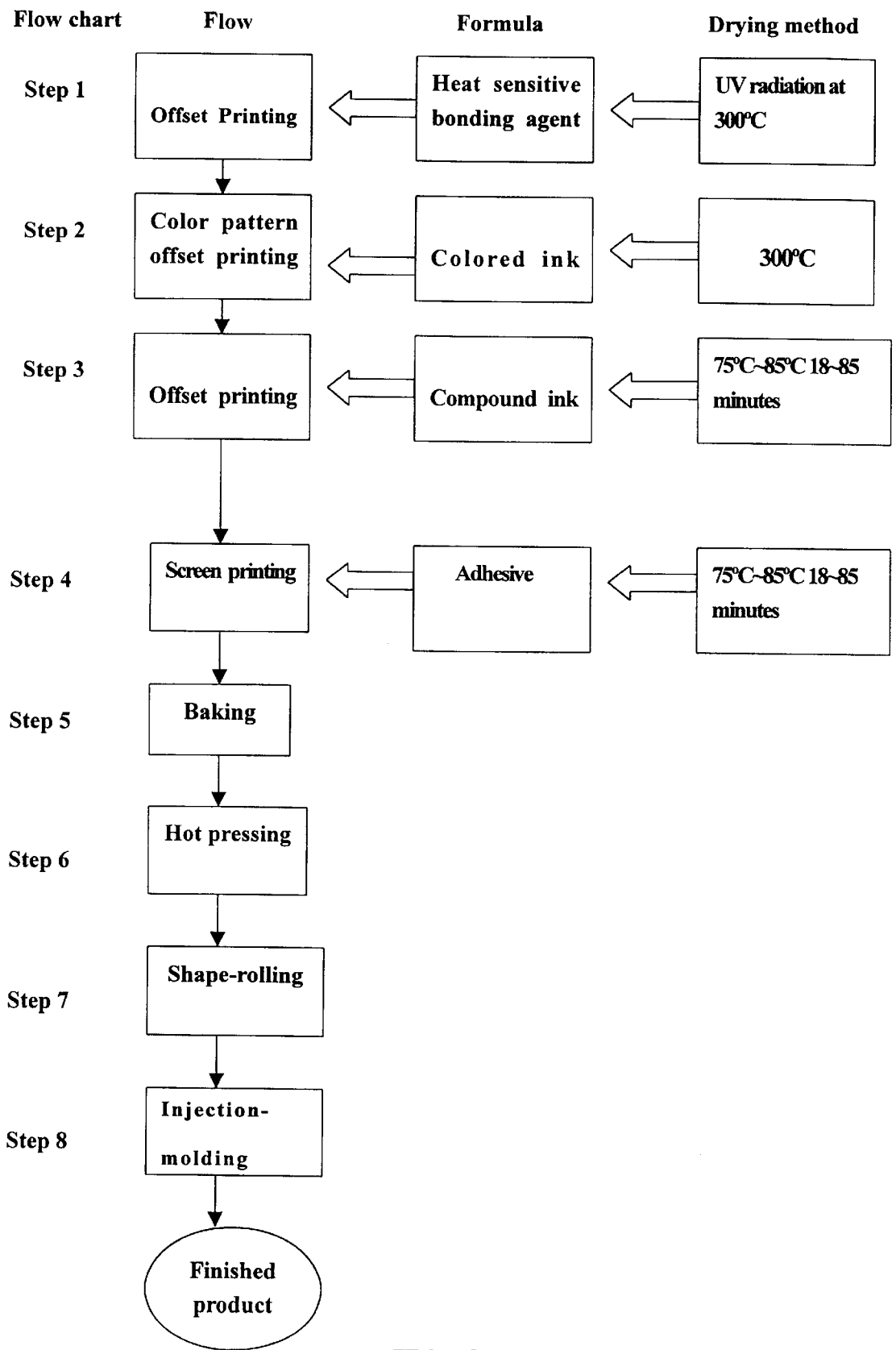
FIG. 2 is a block diagram of an alternate form of the present invention.

FIG. 2 shows an alternate form of the present invention. According to this alternate form, an offset printing procedure is used to print the prepared compound ink on the color pattern-printed single piece of film material instead of the third procedure of primary screen printing and fourth procedure of baking of the aforesaid first embodiment of the present invention, i.e., this alternate form comprises the steps of (1) offset printing where a transparent heat sensitive bonding agent is printed on a single piece of film material and radiated with UV light at about 300° C.; (2) color pattern offset printing where a color printing is printed on the bonding agent of the single piece of film material and radiated with UV light at about 300° C.; (3) offset printing where a compound ink is printed on the color printing of the single piece of film material and baked to a dry status at about 75°~85° for about 18~25 minutes; (4) screen printing where an adhesive is printed on the layer of compound ink of the single piece of film material; (5) baking at about 75°~85° for about 18~25 minutes; (6) hot pressing; (7) shape rolling; and (8) injection-molding.

A prototype of combination printing method has been constructed with the features of FIGS. 1~2. The combination printing method functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A combination printing method comprising the steps of:
   (a) offset printing a transparent heat sensitive bonding agent on a prepared single piece of film material;
   (b) color pattern offset printing a color printing on said bonding agent of said single film material;
   (c) primary screen printing compound ink prepared from a mixture of printing ink and bonding agent on said color printing of said single piece of film material through a silk screen and then drying by baking;
   (d) secondary screen printing an adhesive on said layer of compound ink of said single piece of film material;
   (e) hot pressing said printed single piece of film material in a steel die of a hot press to form a semi-finished product;
   (f) shape rolling said semi-finished product through a shape rolling machine; and
   (g) injection-molding said shape-rolled semi-finished product with plastics into a desired finished product.

2. The combination printing method as claimed in claim 1 wherein:
   said compound ink comprises UV ink, transparent heat sensitive bonding agent, hardening agent, and adhesive.

3. The combination printing method as claimed in claim 1 wherein:
   said transparent heat sensitive bonding agent is dried with UV radiation at 300° C. during step (a), offset printing.

4. The combination printing method as claimed in claim 1 wherein:
   said color printing is dried with UV radiation at 300° C. during step (b), color pattern offset printing.

5. The combination printing method as claimed in claim 1 wherein:
   said compound ink is dried by baking at about 300° C. for about 18–25 minutes during step (c), primary screen printing.

6. The combination printing method as claimed in claim 1 wherein:
   said adhesive is dried by baking at about 300° C. for about 18–25 minutes during step (d), secondary screen printing.

7. A combination printing method comprising the steps of:
   (a) primary offset printing a transparent heat sensitive bonding agent on a prepared single piece of film material;
   (b) color pattern offset printing a color printing on said bonding agent of said single piece of film material;
   (c) posterior offset printing a compound ink prepared from a mixture of printing ink and bonding agent on said color printing of said single piece of film material and then drying by baking;
   (d) screen printing an adhesive on said layer of compound ink of said single piece of film material through a silk screen and then drying by baking;
   (e) hot pressing said printed single piece of film material in a steel die of a hot press to form a semi-finished product;
   (f) shape rolling said semi-finished product through a shape rolling machine; and
   (g) injection-molding said shape-rolled semi-finished product with plastics into a desired finished product.

8. The combination printing method as claimed in claim 7 wherein:
   said compound ink comprises UV ink, transparent heat sensitive bonding agent, hardening agent, and adhesive.

9. The combination printing method as claimed in claim 7 wherein:
   said transparent heat sensitive bonding agent is dried with UV radiation at 300° C. during step (a), offset printing.

10. The combination printing method as claimed in claim 7 wherein:
    said color printing is dried with UV radiation at 300° C. during step (b), color pattern offset printing.

11. The combination printing method as claimed in claim 7 wherein:
    said compound ink is dried by baking at about 300° C. for about 18–25 minutes during step (c), posterior offset printing.

12. The combination printing method as claimed in claim 7 wherein:
    said adhesive is dried by baking at about 300° C. for about 18–25 minutes during the step (d) screen printing.

* * * * *